No. 641,226.  
F. F. RAYMOND, 2d.  
HEEL NAILING MACHINE.  
(Application filed Feb. 20, 1892.)  
Patented Jan. 9, 1900.

(No Model.)  
9 Sheets—Sheet 1.

WITNESSES  
INVENTOR

No. 641,226. Patented Jan. 9, 1900.
F. F. RAYMOND, 2d.
HEEL NAILING MACHINE.
(Application filed Feb. 20, 1892.)
(No Model.) 9 Sheets—Sheet 3.

No. 641,226. Patented Jan. 9, 1900.
F. F. RAYMOND, 2d.
HEEL NAILING MACHINE.
(Application filed Feb. 20, 1892.)
(No Model.) 9 Sheets—Sheet 4.
FIG. 4.
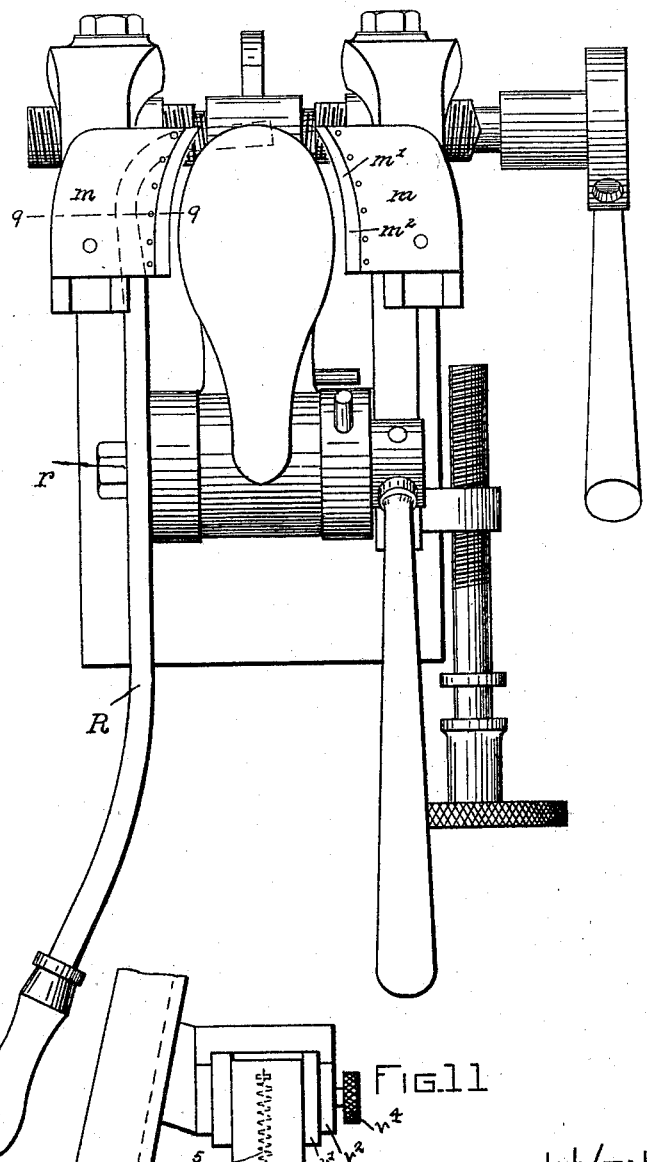
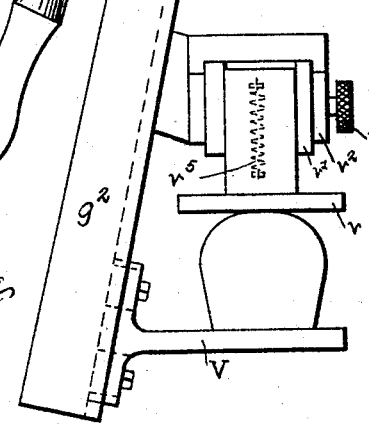
Fig. 11
WITNESSES INVENTOR

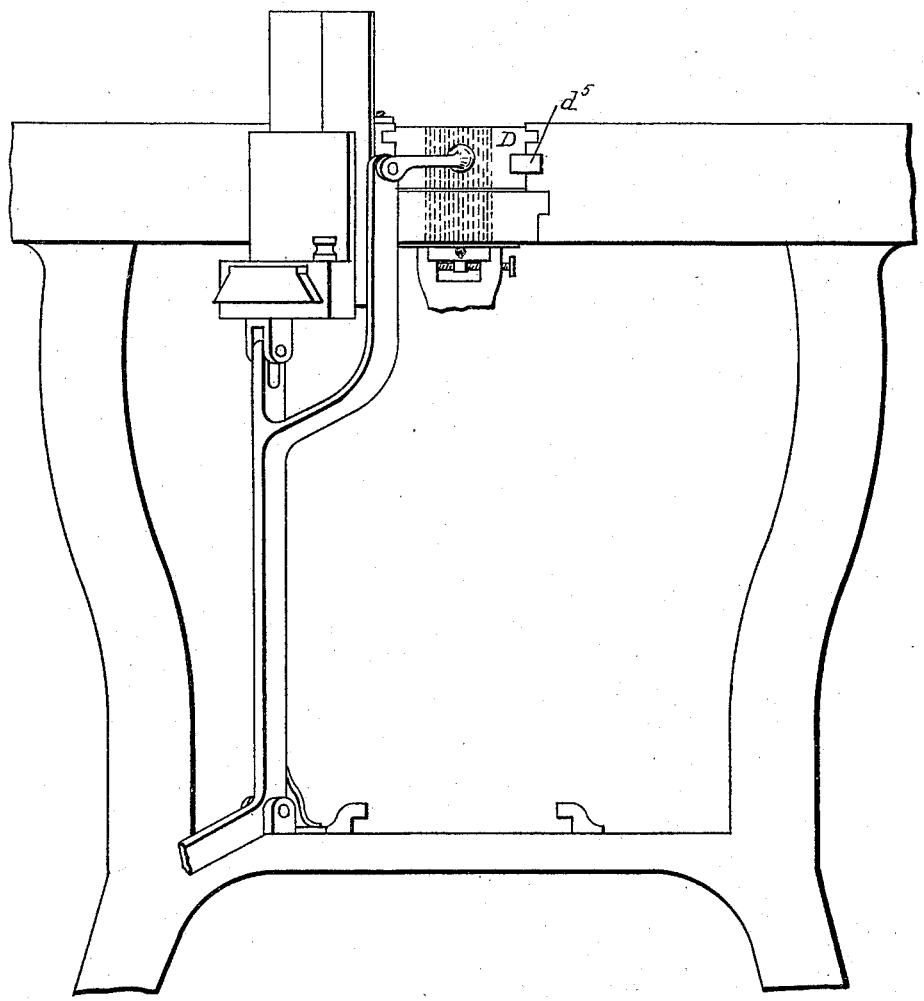

No. 641,226. Patented Jan. 9, 1900.
F. F. RAYMOND, 2d.
HEEL NAILING MACHINE.
(Application filed Feb. 20, 1892.)
(No Model.) 9 Sheets—Sheet 6.

WITNESSES
INVENTOR

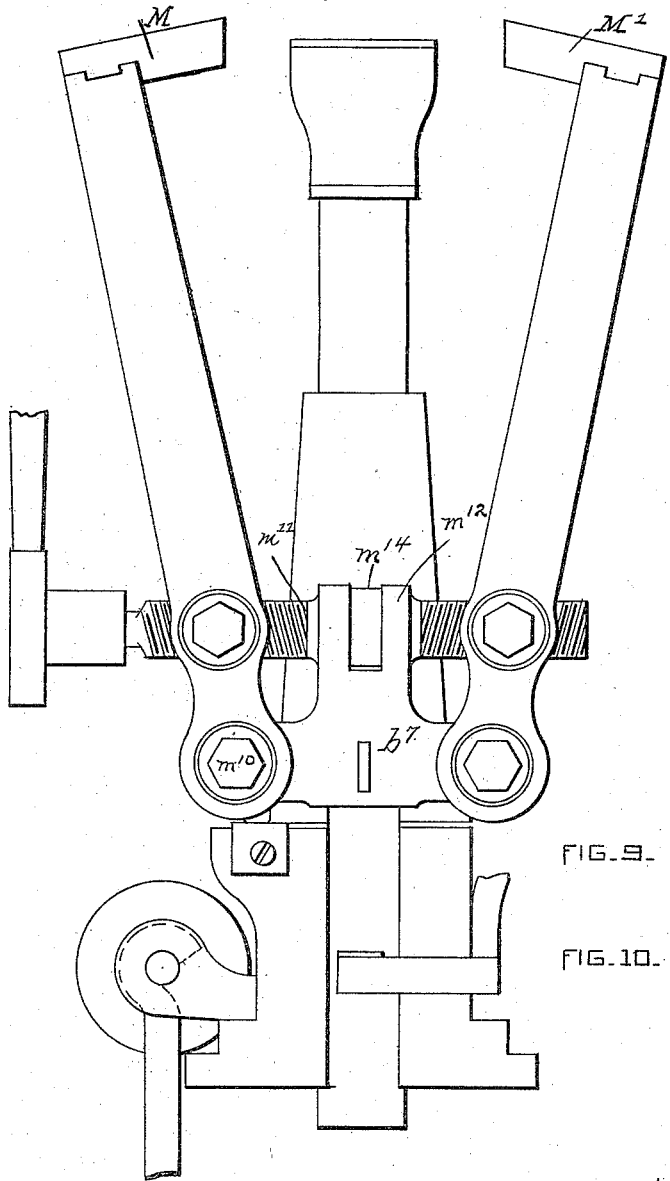

No. 641,226. Patented Jan. 9, 1900.
F. F. RAYMOND, 2d.
HEEL NAILING MACHINE.
(Application filed Feb. 20, 1892.)
(No Model.) 9 Sheets—Sheet 9.

WITNESSES
Jno. Dolan
Leo G. Walsh

INVENTOR
F. F. Raymond

THE NORRIS PETERS CO., PHOTO-LITHO., WASHINGTON, D. C.

UNITED STATES PATENT OFFICE.

FREEBORN F. RAYMOND, 2D, OF NEWTON, MASSACHUSETTS, ASSIGNOR, BY MESNE ASSIGNMENTS, TO THE McKAY SHOE MACHINERY COMPANY, OF MAINE.

HEEL-NAILING MACHINE.

SPECIFICATION forming part of Letters Patent No. 641,226, dated January 9, 1900.

Application filed February 20, 1892. Serial No. 422,318. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Heel-Nailing Machines, of which the following is a full, clear, and exact description, reference being had to the accompanying drawings, forming a part of this specification, in explaining its nature.

The invention relates, first, to a heel-nailing machine having the nail-carrier and top-lift-feeding slide connected with each other, whereby the movement of one causes the movement of the other; second, to an improvement in the nailing-jack; third, to an improvement in the heel-holding devices; fourth, to an organized heel-nailing machine having one reciprocation, wherein the last has two movements in relation to the templet during one reciprocation of the cross-head carrying the drivers and a top-lift-holding plate is moved into operative position after the first reciprocation of the last, but before the second.

It further relates to various details of organization and construction, all of which will hereinafter appear.

Figure 1:
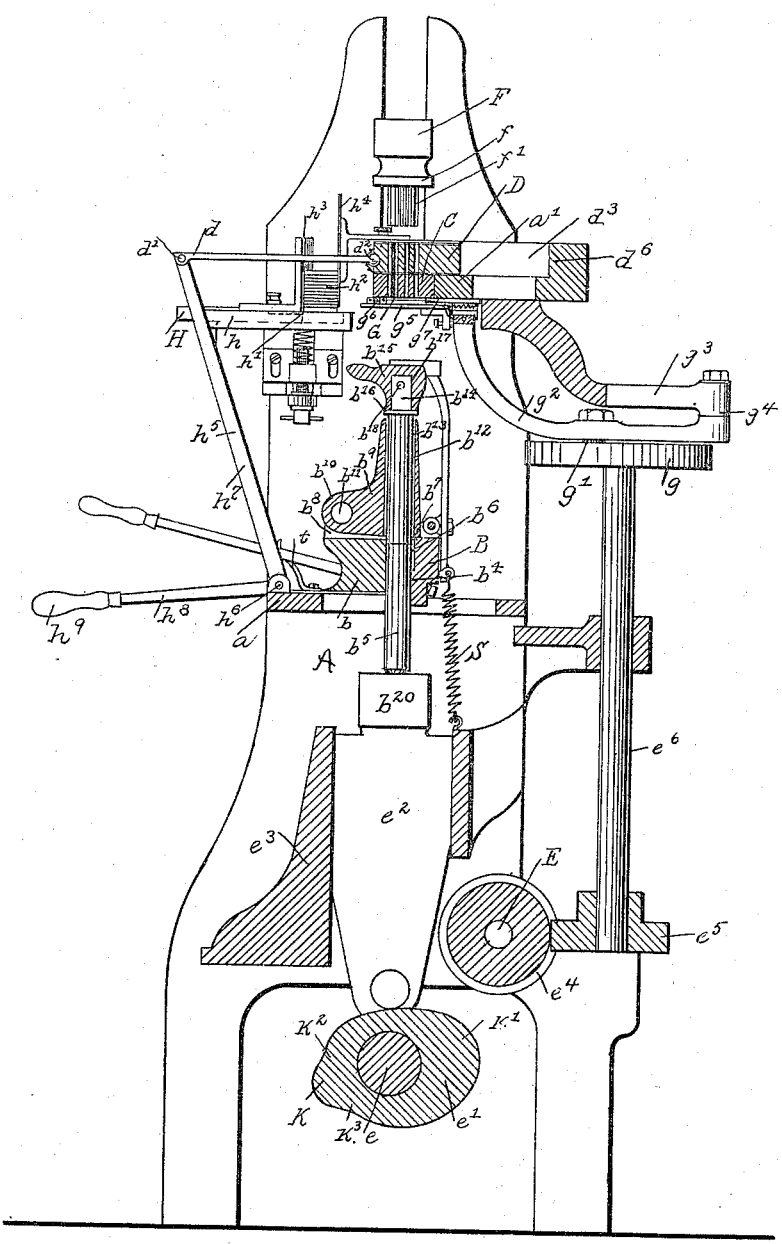
Figure 2:
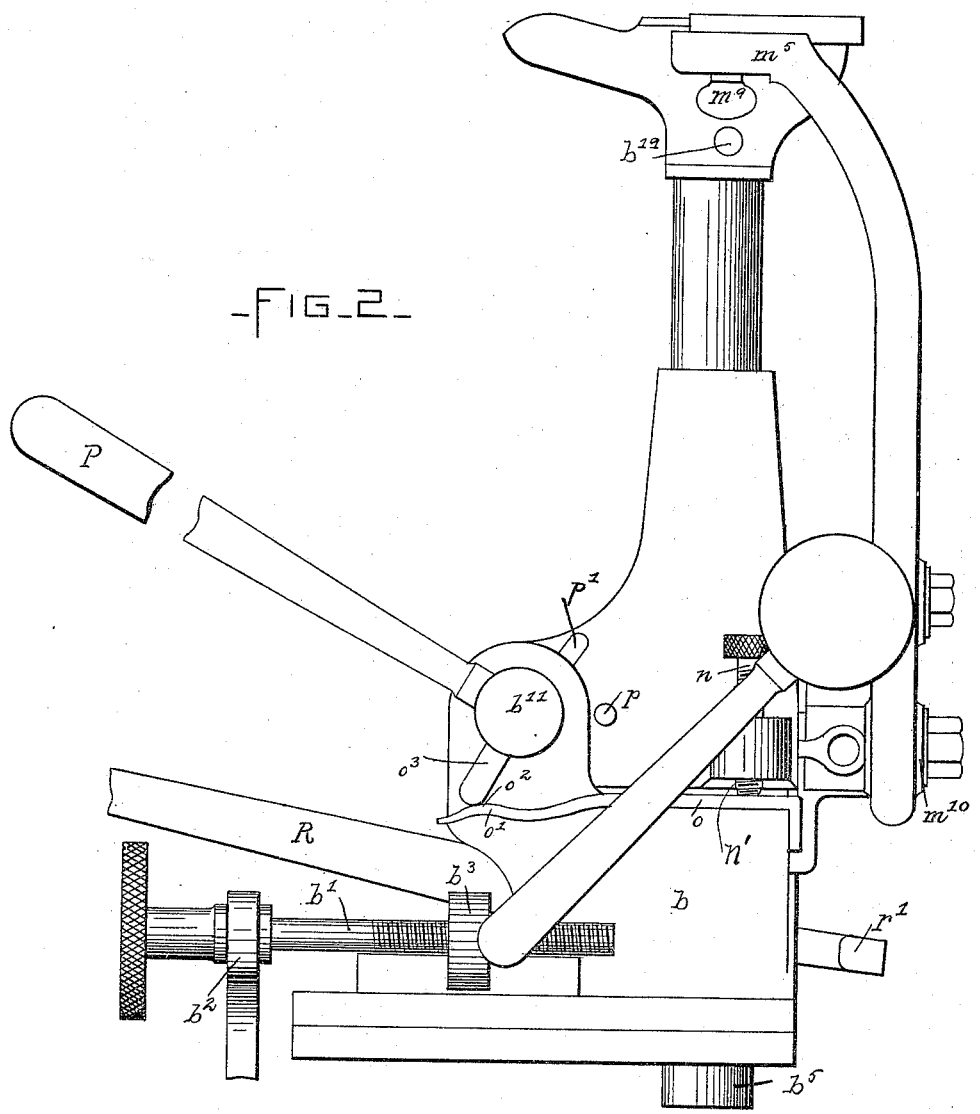
Figure 3:
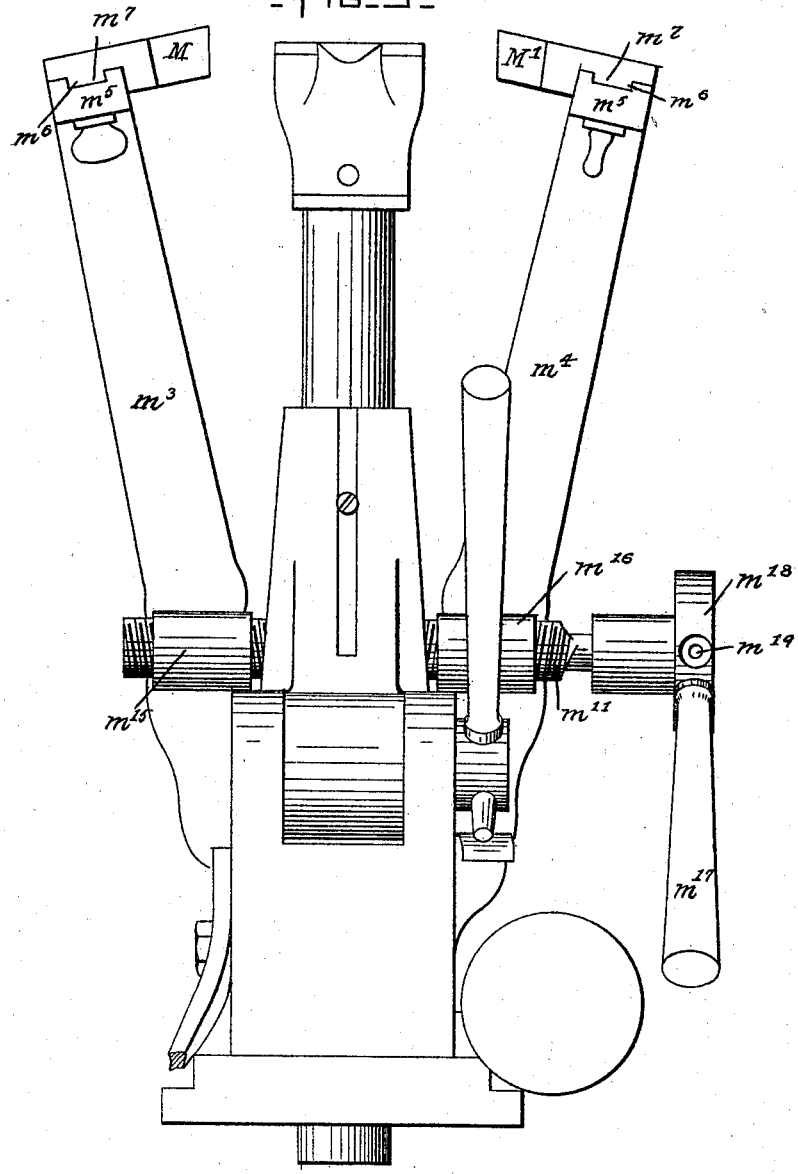
Figure 6:
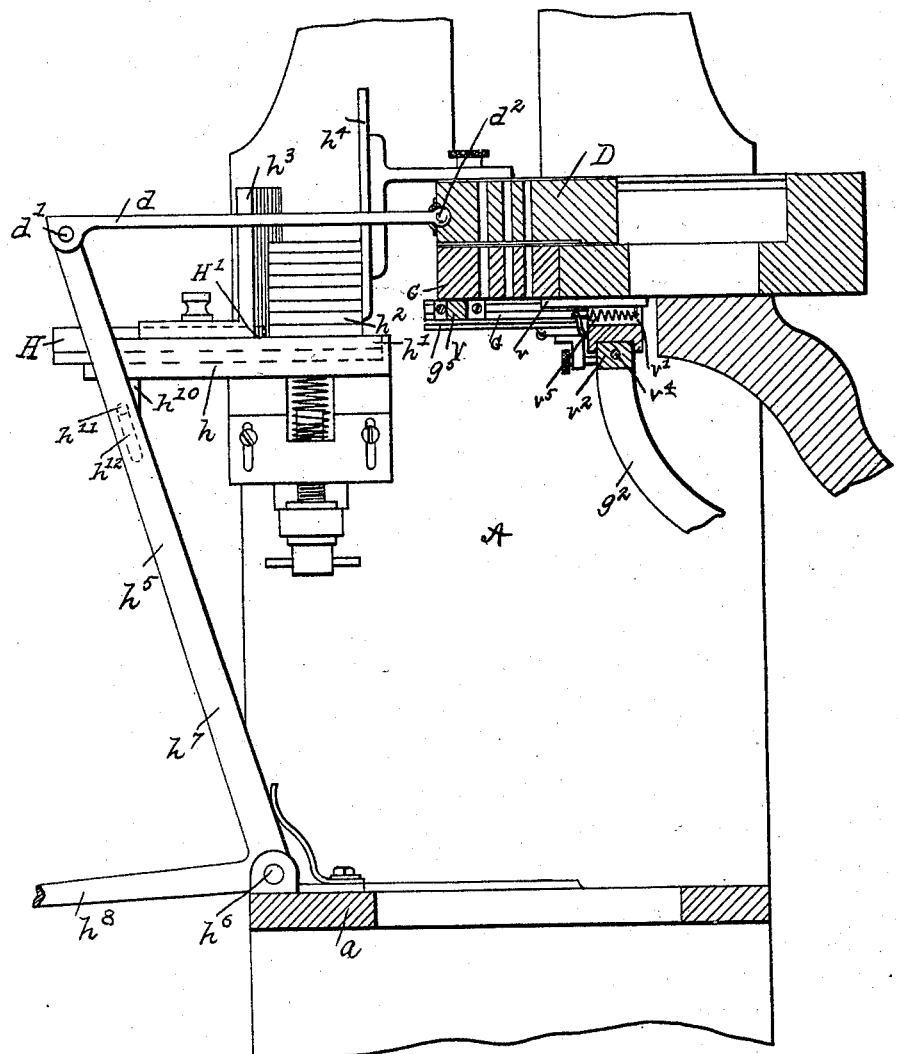
Figure 7:
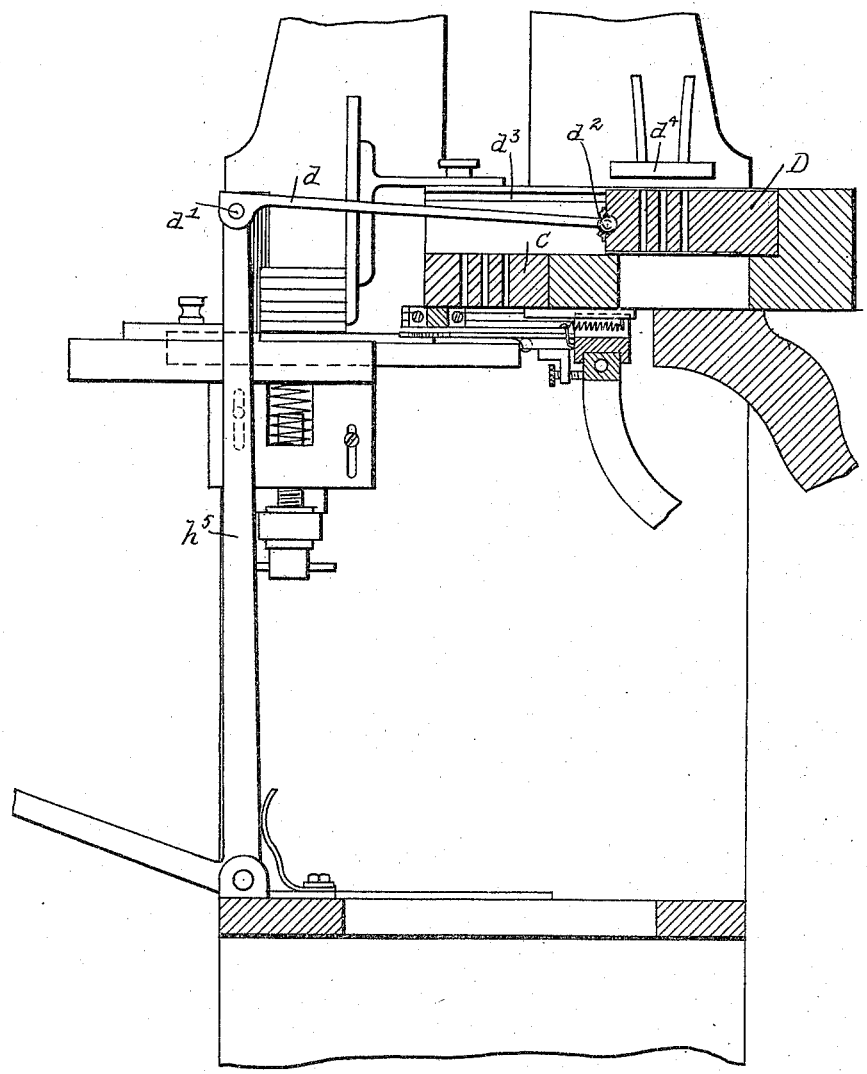
Figure 12:
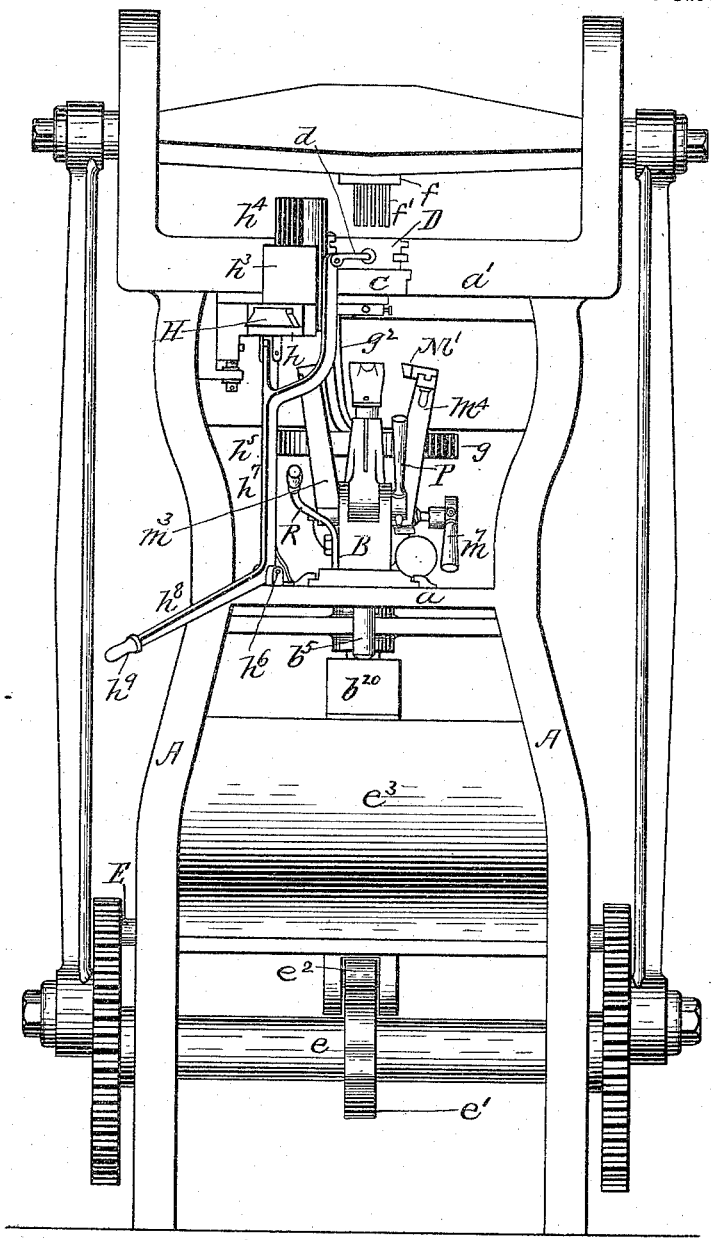
Figure 13:
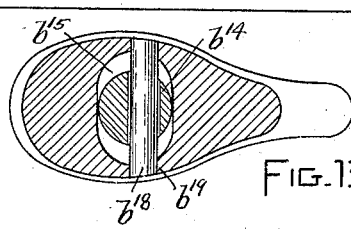

In the drawings, Figure 1 is a view in vertical central section of a machine having the features of my invention. Fig. 2 is a view in side elevation, enlarged, of the improved jack. Fig. 3 is a view in front elevation thereof. Fig. 4 is view in plan thereof. Fig. 5 is a detail view, in front elevation, enlarged, to illustrate the connection between the top-lift slide and nail-carrier. Fig. 6 is an enlarged view, in vertical section and elevation, to further show the connection between the top-lift slide and nail-carrier. Fig. 7 is a view similar to Fig. 6, with the nail-carrier out of alinement with the templet. Fig. 8 is an elevation of the jacks with the shoe holders and guides. Figs. 9 and 10 are details, partly in section, of the guide-blocks. Fig. 11 is a detail in plan of the top-lift carrier and spanker-plate, with breast and back gages. Fig. 12 is a view in front elevation of the machine. Fig. 13 is a view in horizontal section, enlarged, taken through the last and jack-post to show the lateral movement of the former upon the latter.

A is the frame of the machine.

$a$ is an intermediate cross-support or table upon which the frame of the jack B rests.

$a'$ is an upper cross-support which carries the templet C and the nail-carrier D.

E is the power-shaft. It is connected by pinions (not shown) with gears (not shown) upon the shaft $e$. This shaft carries a pressure-cam $e'$, which communicates vertical movement to a slide-head $e^2$, adapted to have a vertical movement in the housing $e^3$.

F is a reciprocating cross-head upon which is mounted a block $f$, carrying a gang or group of drivers $f'$. This cross-head is connected with crank-pins carried by the gears upon the shaft $e$ by means of connecting-rods. (Not shown.) The power-shaft E has a worm $e^4$, which meshes with the worm-wheel $e^5$ on the vertical shaft $e^6$, and this vertical shaft carries a cam $g$, having a cam-groove to receive a cam-pin $g'$, carried by the top-lift-carrier lever $g^2$. This lever is pivoted to the bracket $g^3$ at $g^4$ and supports at its front end the top-lift-spanker plate G, top-lift holders $g^5$, and the heel-blank gages $g^6$ $g^7$. H is the top-lift-feed slide. It is mounted upon a table or support $h$ (which preferably is yielding and vertically adjustable) to have a horizontal movement thereon or therein, and its inner end has the section or tongue $h'$, which is in position under the stack $h^2$ of top lifts in the position represented in Fig. 1, or preparatory to feeding the top lift. This tongue extends from the shoulder H', against which the breast of a top lift rests as it is fed to the receiving devices $g^5$ of the top-lift carrier. The top lifts are held in position by the stack-holder $h^3$ $h^4$. (See Fig. 6.) The top-lift-feed slide is represented as having a feed movement to feed the top lift from the table $h$ to the top-lift carrier imparted to it by means of the bent lever $h^5$, pivoted at $h^6$ to the table $a$, one arm $h^7$ of the bent lever extending from pivot-point to the top-lift-feed slide and the other arm $h^8$ extending horizontally and having a handle $h^9$. The arm $h^7$ is connected with the top-lift-feed slide by means of a loose connection, represented in Figs. 6 and 7 as obtained by means of a stud $h^{10}$, extending downward from the slide and having a pin $h^{11}$, which enters a slot $h^{12}$ in the lever. The lever $h^5$ is also connected with the nail-carrier D by means of the link $d$, which extends from the lever to the nail-carrier and is preferably hinged or pivoted at $d'$ to the lever and is connected with the nail-carrier by a ball or equivalent joint $d^2$. The nail-carrier D is arranged to slide in ways $d^3$ from a position to receive nails from the nail-distributer $d^4$ or other nail-delivering mechanism or by hand to a position to deliver nails to the holes of the templet C or to the nail-driving devices. A stop $d^5$ limits the extent of outward movement of the nail-carrier D and a stop $d^6$ the extent of its movement in the reverse direction. It will thus be seen that the movement of the nail-carrier from one position to another causes the top-lift-feeding slide to be simultaneously moved from one position to another and that this is true whether the movement is imparted to the slides by means of the handle $h^9$ of the lever $h^5$ or whether directly to either of the slides H D. In use the movement of the nail-carrier slide backward from the templet to receive nails causes the top-lift-feeding slide to be advanced to the top-lift carrier and feed a top lift to the holding devices of the top-lift-spanking plate, or to the top-lift-spanking plate, and its movement in the reverse direction causes the nail-carrier to be moved into operative relation with the nail-driving devices and the top-lift-feeding slide to be returned to its original position. For convenience I have represented these movements as being within the control of the operator at the front of the machine, so that by one movement or operation of the operator the nail-carrier is moved into and out of position and a top lift fed to the top-lift carrier or spanking-plate. I would not be understood as limiting the invention to the particular form of the connection between the top-lift-feeding slide and nail-carrier, as the devices herein specified represent only one of many ways by which this connection can be obtained. The top-lift-holding devices represented include the holding-arms and a yielding back gage, and the top-lift-feeding plate is given, when this form of holder is used, sufficient movement to bring the back edge of the top lift into contact with the rear gage and move it backward sufficiently to permit the breast of any size top lift to be moved within the holding-shoulders of the breast-gages.

It will be understood that with the organization of heeling-machine represented in the drawings the nail-carrier is moved into position before the machine is started, and upon the starting of the machine the last, with the shoe thereon, is moved forcibly against the heel and templet and the nail is driven, and that then the last, with the heeled shoe, drops for an instant and the top-lift-carrier plate is fed into position beneath the templet, bringing the top lift over the heel, and that then the last and heeled shoe are moved upward to spank on the top lift and then immediately dropped again, and the top-lift carrier is returned to its original position and the machine comes to rest. The pressure-cam $e'$ upon the shaft $e$ makes one revolution; but it is shaped to give during this revolution, by means of the projections $k$ $k'$ and depressions $k^2$ $k^3$, two movements to the last—first, the upward movement to compress the heel-blank and hold the same during the driving of the nails; second, the dropping movement; third, the upward movement to spank on the top lift, and, fourth, the dropping movement. The operator, preparatory to starting the machine, moves the nail-carrier back to receive or obtain a load of nails and by this movement also forces a top lift into the top-lift holder of the top-lift spanker and carrier. The jack B comprises a base $b$, which is horizontally adjustable in ways in the table or bed $a$, preferably by means of an adjusting-screw $b'$, held by the latch-holder $b^2$, secured to the frame of the machine, and the nut $b^3$, fastened to the base $b$ of the jack. This base has at its rear end a hole $b^4$ of a size to receive the section $b^5$ of the jack-spindle. From this hole extends a narrow recess $b^6$, through which extends a block $b^7$, fastened to the section $b^5$ of the spindle by means of a tongue extending into a hole therein and movable vertically with said spindle. This block $b^7$ holds the arms carrying the shoe centering and holding devices or guides M M'. (See Fig. 8.) The base of the jack $b$ also has at its front end lugs $b^8$, to which is pivoted or hinged the jack-post $b^9$, the jack-post having the ear $b^{10}$, which extends between the lugs and through which and the lugs a stud or shaft $b^{11}$ extends. The jack-post has the hole $b^{12}$ for the reception of the upper section $b^{13}$ of the jack-spindle. This upper section of the spindle has at its upper end a pin $b^{14}$, which enters a hole in the last $b^{15}$, the last resting upon the collar or shoulder $b^{16}$.

I prefer that the pin-hole $b^{17}$ in the last be sufficiently wide to permit lateral movement of the last in relation to it, and when this construction is employed I prefer to secure the last to the pin in a manner to permit such sidewise movement of the last thereon by means of a pin or screw $b^{18}$, extending in through a hole $b^{19}$ in the side of the last to the spindle-pin $b^{14}$. The hole $b^{12}$ in the jack-post is in line with the hole $b^4$ of the base of the jack, and the upper section $b^{13}$ of the jack-spindle bears or rests upon the lower section $b^5$ of the jack-spindle, and this lower section in turn rests upon the adjusting-nut $b^{20}$ of the pressure-head $e^2$. The shoe holders and guides M M' each comprises a block $m$, having the curved inner edge $m'$ shaped to conform to the curve of the heel end of the last along its back corner and side. This curved face of each block is lined with a thick lining $m^2$, of rubber or other suitable material. Each of the blocks $m$ is horizontally adjustable upon its respective holding-arm, each of said arms $m^3$ $m^4$ having its upper end $m^5$ extending horizontally and lengthwise the last and having in its upper surface a groove or way $m^6$ to receive the tongue $m^7$ upon the under surface of the block $m$. (See Figs. 2 and 3.) There is also formed in each section $m^5$ of the arm a long slot through which extends the clamping and adjusting screw $m^9$, which screws into a screw-hole in the block $m$. By loosening the screw the block is adjustable horizontally lengthwise the last upon the arm $m^5$ and by tightening it the block is fastened to the arm in any desired position. By making the holders curved, as described, so as to not only bear against the sides of the last, but also against the rear corners, they serve as they are closed to press the shoe forward, as well as laterally, upon the last, and therefore act not only to clamp the shoe upon the last, but also as a back-stop to prevent its being moved backward from the last.

The arms $m^3$ $m^4$ are each pivoted at $m^{10}$ to the block $b^7$, and they are connected with each other by means of a right and left threaded screw $m^{11}$, which is carried by a standard $m^{12}$ of the block $b^7$ in a manner to prevent it from being moved endwise. This is represented as attained by making the standard forked, providing the enlarged holes therein through which the screw $m^{11}$ passes, and mounting upon the screw in the fork a collar $m^{14}$. The arms $m^3$ $m^4$ are connected with the screw by means of swivel-nuts $m^{15}$ $m^{16}$, respectively, (see Fig. 3,) each of the nuts having a short spindle which extends through a hole in its respective holding-arm and has a threaded end to receive a nut. The screw is turned by the handle $m^{17}$, and this handle is represented as connected with the screw by means of a disk $m^{18}$, fastened to the screw, having in its periphery holes $m^{19}$, in one of which the threaded inner end of the handle $m^{17}$ screws, the handle being removable from one to the other for the purpose of adjusting the operative position of the arms $m^3$ $m^4$. The above description shows that the shoe centering and holding devices are carried by the base of the jack and are horizontally adjustable with it and are vertically movable with the section $b^5$ of the jack-spindle and have an opening and closing movement in relation to each other, and the last is movable upon the arc of a circle from between the said shoe-holders outward. By providing the last with this movement it is held, when inclined, in a convenient position for receiving the shoe and also for removing it, being then entirely removed from the shoe holding and centering devices. It is easily moved from said inclined position into a vertical position between the shoe-holders, and as the inclination of the jack-spindle from a perpendicular position is variable one way or the other, as desired, it provides a means whereby the level of the last, and therefore of the shoe lengthwise of the last, may be easily varied. The adjustment of the jack-post $b^9$, and therefore of the jack-spindle $b^{13}$, is obtained by means of the adjusting-screw $n$, which passes through a threaded hole $n'$ in a lug upon the side of the jack-post and bears upon the upper surface of the base $b$. The end of this adjusting-screw, in other words, furnishes the back-stop for the jack-post when in a vertical or very nearly vertical position.

It is desirable to latch or lock the jack-post and its spindle in its two positions—namely, its inclined and vertical ones—and this is represented as obtained by means of a flat spring $o$, secured to the base $b$ (see Fig. 2) and having its outer end $o'$ shaped, substantially as represented in said figure, to have the rounded or curved surface $o^2$. The jack-post stud or shaft $b^{11}$ is keyed or otherwise secured to the jack-post, so that it turns with it, and it extends beyond one side lug of the base and has a pin $o^3$ extending downward which bears upon the upper surface of the spring $o$, (see Fig. 2,) and when the jack post and spindle are in a vertical position one section of the spring bears against the end of the pin and serves to hold the jack-post locked in such position. When the jack-post is inclined, the shaft or stud $b^{11}$ is turned, turning the pin $o^3$, so that it passes over the curved section $o^2$ of the spring upon the other side thereof, and the spring then acts to hold it latched or locked in its inclined position. To move the jack-post spindle and last from one position to the other, I have attached to the stud or shaft $b^{11}$ a lever P. The operator by moving this lever downward moves the jack-post and last from a vertical to an inclined position. By moving it upward he moves them from an inclined to a vertical position. A stop $p$ upon the jack-post and a stop $p'$ on the base-lug (see Fig. 2) limit the extent of the outward movement of the jack-post, &c.

To lift the jack-spindle, last, and shoe-guides independently of the pressure-head for the purpose of centering the heel to the shoe or for any other reason, there is pivoted to the base $b$ at $r$ the handle R. This pivot is usually near the end of the stud or shaft $b^{11}$. The inner end $r'$ of the lever or handle is bent to extend below the block $b^7$ of the jack, (see Figs. 1 and 2,) and upon the downward movement of the outer end of the handle both sections of the jack-spindle, the last, and the shoe-holders are moved upward. To draw the last and spindles downward and maintain them in contact with the pressure-head, so that they shall follow the movements of the pressure-head, I use a spring S, fastened at its upper end to the block $b^7$ and at its lower end to the housing of the pressure-head. In use, the last being in its receding position, the operator places the shoe thereon and moves the last from its inclined to its vertical position between the shoe-holders. The shoe-holders by the movement of the handle $m^{17}$ are then closed upon the counter of the boot or shoe upon the last and serve to center the shoe thereon and to hold it securely thereto. For certain kinds of work the construction which permits a horizontal movement of the last upon the jack-spindle is desirable, as this enables the shoe-holders to move the shoe and last to an accurate center covered by the outer surfaces of the shoe and not by the inner surfaces of the last, the outer surfaces of the shoe being better surfaces to center by than the last, because of the variations in the thickness of the counter of the shoe at its sides. It frequently happens in coarse work that the counter upon one side is considerably thicker than the counter upon the other. The heel is then placed upon the insole, or, if a heel-holder be employed, in the heel-holder. The operator having moved the nail-carrier and fed the top lift into the top-lift carrier starts the machine and the heel is attached and top lift applied, as above stated. When the machine comes to rest, the shoe-holders are opened and the last removed from between them to its inclined position and the nailed shoe removed. I prefer to use in connection with the lever $h^5$ a spring $t$ to act against the same and hold it, with the nail-carrier, in registering position with the templet.

When the heel-holder is employed, I prefer to use a breast-gage V, attached to the side of the top-lift-spanker plate, to extend beneath the templet C (see Fig. 11) and longitudinally adjustable upon the plate and a back-gage $v$, having a yielding movement in the carriage $v'$, which is adapted to be adjusted crosswise the machine upon the arm $v^2$ of the top-lift lever $g^2$ by means of a nut and an adjusting-screw $v^4$. The back gage is provided with a yielding movement in its holding-block by means of the spring $v^5$.

Having thus fully described my invention, I claim and desire to secure by Letters Patent of the United States—

1. In a heel-attaching machine, the combination of a movable nail-carrier, a top-lift-feeding slide connected with the nail-carrier and hand-operated means such as a lever or handle for simultaneously moving the nail-carrier and top-lift slide, substantially as described.

2. The combination in a heel-nailing machine of a nail holder or distributer, a nail-carrier movable from the nail holder or distributer to the nail-driving devices, a movable top-lift holder and spanker, a top-lift-feed slide, a box for holding top lifts in stack in operative relation with the top-lift-feeding slide, a connection between the top-lift-feeding slide and nail-carrier and hand devices such as a handle or lever for simultaneously moving the nail-carrier from the nail-driving devices to the nail holder and distributer and back again and the top-lift feeder from the top-lift stack to the top-lift spanker and holder and back again, substantially as described.

3. The combination in the heel-attaching machine of the top-lift slide H and the bent lever $h^5$ connected with the slide at its upper end and having the handle $h^9$ and a retracting-spring substantially as described.

4. The combination in a heel-attaching machine of a last or work-support, a movable pressure-head for imparting movement to the last or work-support, the nail-driving devices, a nail-carrier and a top-lift-feeding slide coupled together to be simultaneously moved by a lever, handle or other hand-actuated device, a spanker and top-lift centerer, substantially as described.

5. The combination in a heel-attaching machine of the last or work-support, a pressure-head for imparting movement to the jack-spindle and means such as a cam mounted beneath said head for giving it two reciprocations during one reciprocation of the nail-driving devices, said reciprocating nail-driving devices, a nail-carrier movable into operative position before the machine is started and held in such position during the operation of the machine and a movable top-lift spanker and holder, as and for the purposes described.

6. The combination in a heel-nailing machine of the jack-base $b$, the section $b^5$ of the jack-spindle carried thereby and shoe centering and holding devices secured thereto to be vertically movable therewith with the movable jack-post $b^9$, the section $b^{13}$ of the jack-spindle carried thereby and the last or work-support mounted thereon, substantially as described.

7. The combination in a heel-attaching machine of the shoe holders and centerers $m\,m'$, their pivoted actuating and supporting arms $m^3\,m^4$ and the nuts $m^{15}\,m^{16}$ and right and left threaded screw $m^{11}$ with the pivoted or hinged jack-post $b^9$ and its jack-spindle $b^{13}$ and last or work-support carried by said spindle, substantially as described.

8. The combination of the table of the machine, the jack-base $b$, horizontally adjustable thereon and means such as the screw $b'$ and nut $b^3$ for adjusting it, a section $b^5$ of the jack-spindle carried thereby and projecting below the said base, shoe holding and centering devices attached to said spindle $b^5$, the hinged or pivoted jack-post $b^9$, the section $b^{13}$ of the jack-spindle carried thereby, a last or work-support mounted thereon and the vertically-movable pressure-head to act against the lower end of the section $b^5$ of the jack-spindle, the templet C and the nail-driving devices substantially as described.

9. The combination of the spindle $b^5$, the shoe holding and centering devices carried thereby, the section of the jack-spindle $b^{13}$, the last or work-support carried thereby, the pressure-head for moving the jack-spindle in one direction and the spring S attached to the shoe-holders or their holding-block, as and for the purposes described.

10. The combination of the templet C, the pressure-head and the intermediate jack-spindle, last or work-support carried thereby and shoe centering and holding devices carried by the jack-spindle with the jack-spindle-lifting lever as and for the purposes described.

11. The combination of the pressure-head operating against one end of the jack-spindle, the templet C, the jack-spindle, a last or work-support mounted thereon and the spindle lifting lever R, substantially as described.

12. The combination of the last or work-support, the shoe-holders, their actuating and supporting arms, devices for opening and closing the same and the adjustable lever $m^{17}$ as and for the purposes described.

13. The combination of the hinged or pivoted jack-post $b^9$, the spindle carried thereby, and last or work-support with a jack-post holder for holding it in vertical position as and for the purposes described.

14. The combination of the hinged or pivoted jack-post $b^9$, the spindle carried thereby, and last or work-support with a jack-post holder for holding it in vertical position and jack-post holder for holding it in an inclined position, substantially as described.

15. The combination of the hinged or pivoted jack-post $b^9$, the jack-spindle $b^{13}$ carried thereby, a last or work-support mounted thereon and a latch or holding device to hold the jack-post both in its inclined position and in its vertical position, substantially as described.

16. The combination of the pivoted jack-post $b^9$ the jack-spindle $b^{13}$ carried thereby, the last or work-support, the shaft or pivot $b^{11}$ to which the jack-post is fastened and which turns therewith a latching projection upon said pivot and its engaging spring $o$, shaped as specified, substantially as described.

17. The combination of the pivoted or hinged jack-post $b^9$, the jack-spindle carried thereby, the last or work-support upon said spindle and a handle or lever P for moving the jack-post upon the pivot or hinge, substantially as described.

18. The combination of the jack-post $b^9$, the jack-spindle carried thereby, a last or work-support mounted thereon, the pivot or trunnions $b^{11}$ of the jack-post and the lever P attached to one of the trunnions or pivots as and for the purposes described.

19. The combination of the pivoted or hinged jack-post $b^9$ the jack-spindle $b^{13}$ carried thereby, a last or work-support mounted thereon, and the adjusting-screw $n$ as and for the purposes described.

20. The combination of the last or work-support having a spindle-hole elongated crosswise it, a spindle having a stem to enter said hole and a holding-stud extending from the side of the spindle through a hole in the side of the last for holding the last to the spindle but not to prevent sidewise movement thereof upon the spindle as and for the purposes described.

21. The combination of the last or work-support with the opening and closing arms $m^3$ $m^4$ having the horizontal extensions $m^5$ provided with ways $m^6$ and slots with the blocks $m^7$ having their curved inner faces and tongues to fit said ways and locking-screws $m^9$ as and for the purposes described.

22. The combination in a jack of the blocks M M' undercut upon their inner edges and a facing of rubber or other material applied to such undercut surfaces whereby the overlapping portions of the block serve to hold the rubber or facing as against a vertical strain, as and for the purposes described.

23. The combination in a heel-nailing machine of shoe-centering devices and a last or work-support between the same and laterally movable by them as and for the purpose described.

24. The combination in a heel-nailing machine of a templet, a last or work-support, a gang of drivers and a top-lift-applying device and means for moving the last or work-support toward and from the templet and toward and from the top-lift-applying device during a single reciprocation of the nail-drivers, as and for the purpose set forth.

FREEBORN F. RAYMOND, 2D.

In presence of—
J. M. DOLAN,
M. McFAGUE.